United States Patent

Mourou et al.

[11] Patent Number: 5,541,947
[45] Date of Patent: Jul. 30, 1996

[54] SELECTIVELY TRIGGERED, HIGH CONTRAST LASER

[75] Inventors: Géard A. Mourou; John A. Nees, both of Ann Arbor, Mich.

[73] Assignee: The Regents of the University of Michigan, Ann Arbor, Mich.

[21] Appl. No.: 438,395

[22] Filed: May 10, 1995

[51] Int. Cl.[6] .......................................... H01S 3/10
[52] U.S. Cl. .................. 372/25; 372/96; 372/6; 372/39; 372/102; 372/30
[58] Field of Search ................... 372/30, 6, 96, 372/25, 30, 102; 350/62.12; 455/600

[56] References Cited

U.S. PATENT DOCUMENTS

| | | | |
|---|---|---|---|
| 4,655,547 | 1/1987 | Heritage | 350/162.12 |
| 4,685,107 | 8/1987 | Kafka et al. | 372/6 |
| 4,727,553 | 2/1988 | Fork et al. | 372/25 |
| 4,737,958 | 4/1988 | Sizer, III | 372/25 |
| 4,764,930 | 8/1988 | Bille et al. | 372/25 |
| 4,910,746 | 3/1990 | Nicholson . | |
| 4,928,316 | 5/1990 | Heritage | 455/600 |
| 4,972,156 | 11/1990 | Gregor et al. | 372/25 |
| 4,972,423 | 11/1990 | Alfano et al. | 372/25 |
| 5,234,606 | 8/1993 | Mourou et al. . | |
| 5,235,606 | 8/1993 | Mourou et al. | 372/25 |
| 5,263,039 | 11/1993 | Skupsky et al. | 372/25 |
| 5,265,107 | 11/1993 | Delfyett, Jr. | 372/25 |
| 5,353,291 | 10/1994 | Sprangle et al. . | |
| 5,469,454 | 11/1995 | Delfyett, Jr. | 372/25 |

OTHER PUBLICATIONS

E. B. Treacy, "Optical Pulse Compression with Diffraction Grating", IEEE J. Quantum Electron., QE-5, 454–458, Sep. 1969.

D. Strickland and G. Mourou, "Compression of Amplified Chirped Optical Pulses", Optics Communications, vol. 56, No. 3, 219–221, Dec. 1, 1985.

G. Mourou, D. Strickland, and S. Williamson, "How Pulse–Compression Techniques Can Be Applied to High–Energy Laser Amplifiers", Laser Focus/Electro–Optics, 354–356, Jun. 1986.

L. Li, G. Wylangowski, D. N. Payne, and R. D. Birch, "Broadband Metal/Glass Single–Mode Fibre Polarisers", Electronics Letters, vol. 22, 1020–1021, Aug. 4, 1986.

F. Oullette, "All-Fiber Filter for Efficient Dispersion Compensation", Optics Letters, vol. 16, No. 5, 303–305, Mar. 1, 1991.

J. Squier, F. Salin, G. Mourou, and D. Harter, "100–fs Pulse Generation and Amplification in Ti:Al$_2$O$_3$", Optics Letters, vol. 16, No. 5, 324–326, Mar. 1, 1991.

M. Öberg, S. Nilsson, T. Klinga, and P. Ojala, "A Three-–Electrode Distributed Bragg Reflector Laser with 22 nm Wavelength Tuning Range", IEEE Photonics Technology Letters, vol. 3, No. 4, 299–301, Apr. 1991.

(List continued on next page.)

Primary Examiner—Leon Scott, Jr.
Attorney, Agent, or Firm—Barnes, Kisselle, Raisch, Choate, Whittemore & Hulbert

[57] ABSTRACT

The invention provides a method and apparatus for generating high pulse energy, short optical pulses having relatively high contrast. The system comprises a diode laser to seed a compact diode pumped amplifier, and comprises pulse shaping and cleaning elements to achieve relatively high energies and high contrast. The system is not locked to a fixed repetition rate as it is controlled by an electronic trigger. The system of the invention comprises a selectively triggered pulse source (asynchronous) which is coupled to pulse amplifying/pulse shaping means, which is coupled to pulse cleaning means, which is further coupled to a chirped pulse amplification (CPA) system. The method of the invention comprises the general steps of: (1) selectively triggering a pulse source; (2) amplifying the pulse and shaping it; (3) increasing contrast of the pulse utilizing a preferred, passive, nonlinear pulse cleaner; and (4) increasing the energy of the pulse and decreasing its pulse width by chirped pulse amplification (CPA) means. In the method of the invention, steps (2) and (3) may be repeated in order to achieve a desired energy intensity and contrast.

45 Claims, 3 Drawing Sheets

OTHER PUBLICATIONS

J. Tapie and G. Mourou, "Shaping of Clean Femtosecond Pulses at 1.053 μm for Chirped Pulse Amplification", Optics Lett., vol. 17, No. 2, 136–138, Jan. 15, 1992.

Y. Beaudoin, C. Y. Chen, J. S. Coe, J. L. Tapie, and G. Mourou, "Ultrahigh–Contrast Ti:sapphire/Nd:glass Terawatt Laser System", Optics Lett., vol. 17, No. 12, 865–867, Jun. 15, 1992.

J. Squier and G. Mourou, "Tunable Solid–State Lasers Create Ultrashort Pulses", Laser Focus World, Jun. 1992.

D. H. Reitze, A. M. Weiner, and D. E. Leaird, "Shaping of Wide Bandwidth 20 Femtosecond Optical Pulses", Applied Physics Letters, vol. 61, No. 11, 1260–1262, Sep. 14, 1992.

T. B. Norris, "Femosecond Pulse Amplification at 250 kHz with a Ti:sapphire Regenerative Amplifer and Application to Continuum Generation", Opt. Lett., vol. 17, No. 14, 1009–1011, Jul. 15, 1992.

M. C. Farries, C. M. Ragdale, and D. C. J. Reid, "Broadband Chirped Fibre Bragg Filters for Pump Rejection and Recycling in Erbium Doped Fibre", Electronics Lett., vol. 28, No. 5, 487–489, Feb. 27, 1992.

A. Galvanauskas, P. Blixt, and J. A. Tellefsen, Jr., "Generation of Femtosecond Optical Pulses with Nanojoule Energy from a Diode Laser and Fiber Based System", Appl. Phys. Lett., vol. 63, No. 13, 1742–1744, Sep. 27, 1993.

H. C. Kaptcyn and M. M. Murnane, "Femtosecond Lasers: The Next Generation", Optics & Photonics News, 20–28, Mar. 1994.

N. Kalonji and J. Semo, "High Efficiency, Long Working Distance Laser Diode to Singlemode Fibre Coupling Arrangement", Electronics Letters, vol. 30, 892–893, Mar. 28, 1994.

M. C. Farries, K. Sugden, D. C. J. Reid, I. Bennion, A. Molony, and M. J. Goodwin, "Very Broad Reflection Bandwidth (44 nm) Chirped Fibre Gratings and Narrow Bandpass Filters Produced by the Use of an Amplitude Mask", Electronics Letters, vol. 30, 891–892, May 3, 1994.

B. J. Eggleton, P. A. Krug, L. Poladian, K. A. Ahmed, and H. F. Liu, "Experimental Demonstration of Compression of Dispersed Optical Pulses by Reflection from Self–Chirped Optical Fiber Bragg Gratings", Optics Letters, vol. 19, No. 12, 877–879, Jun. 15, 1994.

A. Galvanauskas, M. Fermann, P. Blixt, J. Tellefsen Jr., and D. Harter, "Hybrid Diode–Laser Fiber–Amplifier Source of High–Energy Ultrashort Pulses", Optics Lett., vol. 19, No. 14, 1043–1045, Jul. 15, 1994.

A. Galvanauskas, M. E. Fermann, and D. Harter, "High–Power Amplification of Femtosecond Optical Pulses in a Diode–Pumped Fiber System", Optics Letters, vol. 19, No. 16, 1201–1203, Aug. 15, 1994.

M. Stock and G. Mourou, "Chirped Pulse Amplification in an Erbium–Doped Fiber Oscillator/Erbium–Doped Amplifier System", Optics Communication, vol. 106, No. 4, 5, 6, 249–252, Mar. 15, 1994.

SELECTIVELY TRIGGERED, HIGH CONTRAST LASER

GOVERNMENT RIGHTS

This invention was made with government support provided by the National Science Foundation, Science and Technology Center under Contract Number STC-PHY-8902108. The government has certain rights in the invention.

FIELD OF THE INVENTION

This invention relates generally to laser systems and more specifically to methods and apparatus for generating high intensity short optical pulses.

BACKGROUND OF THE INVENTION

In the past five to ten years, the technique of chirped pulse amplification has been used to develop compact, high peak power laser systems utilizing amplifying media such as Nd: glass, Ti: sapphire, and alexandrite. These systems are capable of generating very high intensity, on the order of $10^{18}$ to $10^{21}$ watts per square centimeter. In an ideal case, all of the energy is contained in a relatively short main pulse for deposition onto a target. However, in the real world the pulse is not ideal. The chirped non-linearities associated with chirped pulse amplification (CPA) contribute to wings forming what is analogous to a pedestal surrounding the main laser pulse. This results in low peak to background intensity contrast on the order of 1,000 to 1. Accordingly, it is desirable to improve the power contrast ratio of these laser systems. The peak to background intensity contrast is typically determined in the field by dividing peak intensity by background intensity where the peak value is the highest value of intensity of the pulse and the background intensity is the next largest intensity value of the pulse. A typical CPA system is described in U.S. Pat. No. 5,235,606 which is incorporated herein by reference in its entirety.

SUMMARY OF THE INVENTION

The invention provides a method and apparatus for generating high pulse energy, short optical pulses having relatively high contrast desirably greater than 10,000 to 1, preferably greater than 100,000 to 1, and most preferably a contrast of one million to 1. The system comprises a diode laser to seed a compact amplifier pumped by light from one or more laser diodes or diode pumped lasers, and comprises pulse shaping and cleaning elements to achieve relatively high energies and high contrast. The system is not locked to a fixed repetition rate as it is selectively triggered by an electronic trigger. The system of the invention comprises a selectively triggered pulse source which is coupled to pulse amplifying/pulse shaping means, which is coupled to pulse cleaning means, which is further coupled to a chirped pulse amplification (CPA) system.

The method of the invention comprises the general steps of: (1) selectively triggering a pulse source; (2) amplifying the pulse and shaping it; (3) increasing contrast of the pulse utilizing a preferred, passive, nonlinear pulse cleaner; and (4) increasing the energy of the pulse and decreasing its pulse width by chirped pulse amplification (CPA) means. In the method of the invention, steps (2) and (3) may be repeated in order to achieve a desired energy intensity and contrast.

More specifically, in one embodiment, the method of the invention comprises producing an optical pulse by first generating a series of optical pulses while varying at least one pulse characteristic. Preferably, the characteristic or characteristics to be varied are selected from among pulse width, interpulse spacing, and pulse intensity. After the pulse is generated, at least one pulse characteristic is increased. The characteristic or characteristics to be increased are selected from among energy, spectral bandwidth, and pulse width. At the conclusion of this step, the pulse width is minimized and the peak intensity is maximized using the available pulse energy. Next is the step of increasing pulse contrast by transmitting a major portion of the peak intensity of the pulse while preventing transmission of a major portion of the lower intensities of the pulse. Finally, pulse energy is increased by chirped pulse amplification of each of the pulses. The chirped pulse amplification technique comprises, in sequence, the steps of chirping the pulse, that is, stretching it temporally and decreasing its peak power; then, amplifying the chirped pulse; and then compressing the chirped and amplified pulse. It is preferred that the step of increasing pulse contrast is repeated before the steps of chirped pulse amplification are conducted.

In one embodiment, the apparatus used for producing optical pulses having high contrast, and variable pulse width, interpulse spacing, and/or pulse intensity, comprises the following basic components. An optical pulse generating means produces a series of optical pulses including means to vary one of the aforesaid pulse characteristics. In the case where the generating means comprises means to provide a pulse of a desired spectral bandwidth, a desired temporal distribution, and peak power, the system comprises means to amplify the pulse to increase pulse energy. In order to increase contrast, the system comprises means for intensity discrimination which transmits a major portion of the peak intensity of the pulses and prevents transmission of a major portion of the lower intensity of the pulses. The system comprises second amplification means to increase pulse energy which may further comprise means to split each of the high contrast pulses into a plurality of separate pulses with a plurality of amplifiers arranged in parallel to amplify a respective one of the separated pulses. The system comprises compression means to reduce the pulse width and such compression means comprises means to collimate the plurality of amplified pulses so as to compress them with a single compressor apparatus; and a compressor to compress the single pulse to reduce its pulse width.

In another embodiment, the means to generate the pulse does not provide the desired bandwidth and temporal pulse profile. In this case, the system comprises first (pre-amplification) means to increase pulse energy; bandwidth generation means to increase the spectral bandwidth of the pulse; and means to decrease pulse intensity while increasing pulse width. The pre-amplifier, bandwidth generator, and stretcher are arranged together between the pulse generator and the intensity discrimination means. A single component, such as optical fiber, may be used to add bandwidth. It is preferred that a compressor be disposed between the fiber and the intensity discrimination means so that a bandwidth generating element is coupled to the compressor and the compressor is optically coupled to the intensity discrimination means. It is further preferred that the intensity discrimination means is coupled to a stretcher which is coupled to second amplification means comprising the aforementioned amplifier or amplifiers arranged in parallel configuration. In this embodiment, the elements of the system comprise the optical pulse generator; first amplification means (pre-amplifier); bandwidth generation means; compression means; intensity discrimination means; second stretching means; second amplification means comprising one or more amplifiers; and second compressor means comprising means to recombine one or more amplified pulses in a bulk compressor.

The optical pulse generating means preferably comprises a laser diode selectively triggered by a pulse source. Preferably, the laser diode is a distributed BRAGG reflection (DBR) diode laser triggered by an electrical pulse generator, and operable in the range of 795 to 815 nanometer wave length. Preferably, the optical pulse generator comprises a comb generator. In one embodiment, the laser diode is a three section laser diode with variable amplitude, frequency, and phase adjustment means, each individually variable, and driven by electrical pulses produced by the pulse source. In one embodiment, the selectively triggered pulse source is a Q-switched laser.

It is preferred that each of the amplification means (amplifiers) comprises a guided wave optical element and preferably is an optical fiber. A preferred optical fiber is a Tm-Doped fluoro-zirconate glass fiber. In one embodiment, the means to increase spectral bandwidth and/or pulse energy comprises at least two optical fibers, at least one of which is a Tm-Doped fluoro-zirconate glass fiber.

It is preferred that the means to increase spectral bandwidth and/or pulse energy further include a chirped fiber grating coupled to the one or more optical fibers at one end of the intensity discrimination means. There is a fiber grating having a reverse chirped relative to the first grating. This reverse chirp fiber grating is coupled to the second end of the intensity discrimination means. In this embodiment, the intensity discrimination means is disposed between the first chirped fiber grating and the second fiber grating which is a reverse chirped fiber grating. It is preferred that the intensity discrimination means comprises more than one fiber polarizer; and a guided wave optical element disposed between polarizers.

In one embodiment, the CPA system accepts the optical pulses from the intensity discrimination means and is optically coupled to the reverse chirped fiber grating. The CPA system comprises the aforementioned means to split each of the pulses into a plurality of separate pulses which are delivered to amplifiers arranged in parallel where each respective amplifier amplifies a respective one of the separated pulses. Preferably, the CPA means further includes means to collimate the plurality of amplified pulses so as to compress them in a single bulk compressor.

It is an object of the invention to provide method and apparatus to produce short pulses while varying one or more of pulse width, interpulse spacing, and pulse intensity.

It is another object to provide method and apparatus for producing optical pulses at a variable repetition rate.

Still another object is to provide method and apparatus which produce high energy, short pulses of relatively high contrast.

Another object is to provide a subpicosecond laser system which is relatively flexible and adaptable to operation according to the repetition rate of external systems; and which is relatively economical and cost effective to operate, and adaptable to commercial and industrial applications.

These and other objects, features, and advantages of the invention will become apparent from the following description of the preferred embodiments, claims, and accompanying drawings.

DETAILED DESCRIPTION OF THE PREFERRED EMBODIMENTS

Before describing the invention, it is useful to understand the problems associated with present short pulse lasers which deter their use for many medical, commercial, and industrial applications. The predominate limiting factor is the size and cost of systems available today. Typically, subpicosecond lasers currently require the use of an Argon ion or flashlamp pump source. The configuration of such lasers then requires interferometric stability because the mechanisms for short pulse formation are resonant. As a result, these systems cost many tens of thousands of dollars. They also occupy tens of square feet of space. Considering the costs of utilities and replacement parts, it is rarely cost effective to use such systems in commercial applications.

A second constraint found in current short pulse lasers is that they produce pulses at a repetition rate based on their own internal clocks and do not have the capability to operate with widely varying pulse to pulse intervals. Many applications in electronics, telecommunications, and micro-machining require that optical pulses be delivered in synchronism to an external clock which may vary widely in repetition rate.

A third limitation found in high pulse energy short pulse lasers is that of poor contrast. This problem stems from two possible sources. One source is that a mode locked seed laser is used to trigger pulse formation and the ability to cancel out neighboring pulses is limited. Also, these high-gain systems suffer from amplification of spontaneous emission. Either of these mechanisms produces a pre-pulse energy which may prematurely alter the system utilizing the optical pulse energy.

A fundamental limitation of pulse duration is placed on any optical system by the bandwidth of the optical components propagating and modifying the pulse. This is cast in the form of an uncertainty relation:

$$\tau_p \cdot \Delta\omega \leq \tfrac{1}{4}\pi$$

where $\tau_p$ and $\Delta\omega$ are the root mean square pulse widths and angular frequency of the pulse intensity.

Typical short pulse oscillators use various methods of overcoming the laser gain medium's natural tendency to limit bandwidth. In general, these sources use some relatively weak spectral broadening mechanisms, many times by including it in the laser resonator cavity. In each round trip, the pulse gains a small amount of bandwidth and is capable of shorter duration, however, it is necessary to compensate for the group velocity dispersion (GVD) of the materials in the oscillator. As a result, the laser's repetition rate is locked to the inverse of its cavity round trip time.

The invention utilizes the long interaction lengths available in optical wave guides to unfold the oscillator in order to make its design single pass. Having distributed the pulse shaping mechanisms in a sequential fashion, the pulse repetition rate is no longer determined by the laser cavity's round-trip time.

Figure 1:
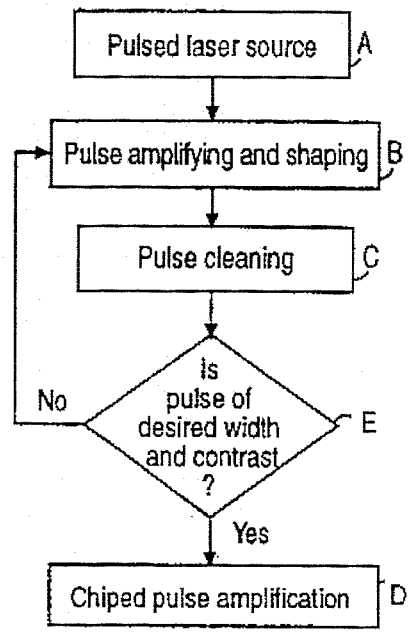
FIG. 1 is a flow diagram showing a general process for generating high energy, high contrast, short pulses.
Figure 3A:
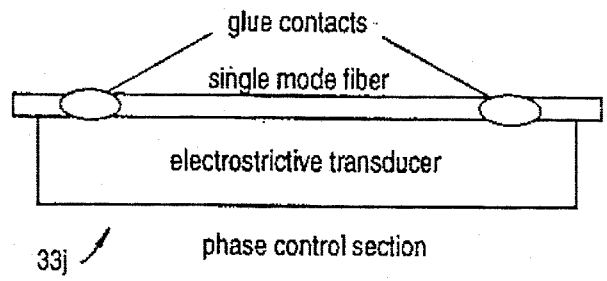
Figure 3B:
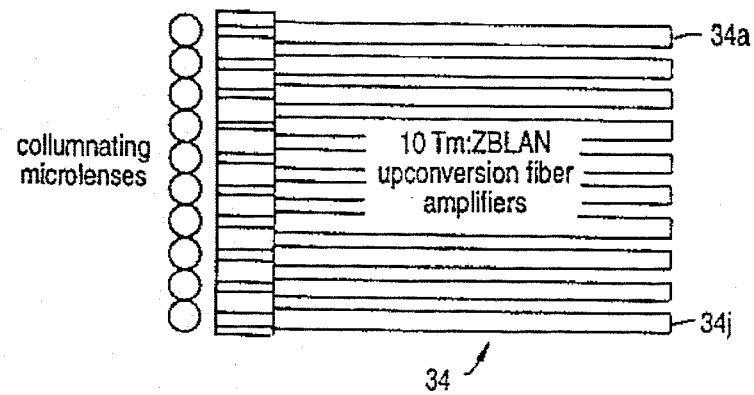

The invention provides the bandwidth necessary to form short pulses, while also accurately controlling the phase of each spectral component. In particular, the phase must be as linear a function of frequency as possible. It may also be necessary to place a strong quadratic phase dependence on the spectrum to reduce the risk of damage due to peak pulse intensity during amplification. The present invention provides the arrangement of optical wave guide components necessary for manipulation of pulses from selectively triggered seed lasers, in order to form high contrast short pulses with energies up to, but not limited to, 30 µJ and having peak to non-peak contrast of $10^6$. Strategic use of guided wave elements, such as wave guides, optical fibers, and semiconductor pumped solid state lasers, reduces the size and cost of the laser systems while improving reliability. FIG. 1 shows a general schematic diagram of the invention.

A Compact System for Generating

Short Pulses (FIG. 1—Blocks A & B)

The first block of FIG. 1, labelled (A), is a pulse source. In this subsystem (A) it is necessary to generate an optical pulse independent of the use of an oscillator. The pulse is then conditioned to have ~1 kW peak power and <1 ns pulse duration. This is accomplished by gain switching a semiconductor laser or some other compact source to produce a 100 ps pulse. This pulse is then amplified in a guided wave optical amplifier, block (B), to the level of 100W peak power. If the source laser operates in a single longitudinal mode the amplified pulse will produce self modulation in a standard telecommunication fiber such as that used in fiber grating compression schemes. After propagating in a sufficient length of this fiber the bandwidth needed to support a significantly shorter pulse will be generated. Due to the nature of self phase modulation, the pulse will have a large fraction of its energy chirped. This chirped pulse is coupled through a directional coupler into a fiber having chirped Bragg reflection to produce upon reflection the short pulse. If necessary, this process may be repeated to produce a single picosecond pulse. The pulse may be amplified to the nJ level in a guided wave amplifier. Alternately, a three section laser diode may be driven to produce a chirped pulse which is amplified and compressed to the picosecond, nJ level.

Pulse Cleaner (FIG. 1—Block C)

With the schemes described above a picosecond pulse with nJ energy is formed. The contrast between the peak power of this pulse and the power of light not arriving in the main pulse is generally poor. To improve the contrast of the pulse, nonlinear intensity discriminator, block (C), must be employed to reject the energy in the low power wings of the main pulse, while passing higher power levels. In one such pulse cleaner, block (C), nonlinear birefringence induces a change in polarization state for the peak of the pulse while the wings, remaining unchanged, are rejected. This style of pulse cleaner could be modified by the use of in-fiber polarizers. Other types of discrimination might include, but are not limited to fiber sagnac interferometers with self phase modulation providing increased transmittance for the phase retarded peak intensity, and nonlinear evanescent wave directional couplers. Pertinent optical properties include, but are not limited to, nonlinear birefringence, nonlinear refractive index (index changes with intensity), and cross phase modulation.

The optical energy coming from the pulse cleaner is directly timed with the pulse from the first seed laser. It has picosecond duration and exhibits contrast of a few orders of magnitude. It is preferred to further improve contrast, by means of a second stage of pulse cleaning. This provides contrast on the order of $10^6$.

Amplification (FIG. 1—Block D)

While applications for short nJ and pJ level pulses exist, compact means of amplifying such pulses is only recently available in guided wave optical amplifiers. Utilizing the limited operation of these amplifiers to their greatest extent requires chirped pulse amplification (CPA), as per block (D). Use of this technique involves first stretching a short pulse to lower its peak power by orders of magnitude, then amplifying to the threshold of energy induced damage then compressing the pulse to its original duration. The primary pulse stretcher in such a system is preferably made using chirped gratings in optical fibers. Amplification is then carried out in a single channel or preferably in multiple channel fiber amplifiers. Finally, compression is preferably accomplished with free propagating beams using a grating compressor.

Decision Block (E)—FIG. 1

Decision block (E) is interposed between blocks (C) and (D) of FIG. 1. In the event that the pulses have obtained the required contrast and width after one pass, they proceed from block (C) to (D) directly. If the desired width and contrast are not achieved, the process of blocks (B) and (C) are repeated before the process of block (D).

Referring to the basic block diagram of FIG. 1, in one configuration, the generator and source of seed pulses for an amplified laser system is a gain switched semiconductor laser with a center wave length, for example, at 808 nm. The gain switching is accomplished by driving a 100 ps to 200 ps current pulse through a conventional Fabry-Perot laser diode. The typical response of such diodes is the generation of a 20 ps to 100 ps optical pulse lasing as a single relaxation oscillation in a single longitudinal mode of the laser. As there are typically between 5 and 10 longitudinal modes within the gain bandwidth of a laser diode, it is necessary to force the diode into one particular mode each time it lases. This is accomplished in one of two ways. A cw seed lase injects a small amount of light into the laser facet seeding one mode. The injection laser is temperature controlled and driven slightly above threshold to prevent mode hopping. Alternatively, a distributed feedback (DFB) laser diode, which utilizes a grating superimposed on the gain section of the laser diode, may be used. In the latter case, only one mode is allowed within the lasers gain bandwidth. Using either of these schemes a sub 30 ps, 3 pJ pulse is generated from a 100 ps to 200 ps electronic pulse of a few volts in 50 Ω. Fabry-Perot laser diodes in the range of 810 nm +/−10 nm are manufactured by Sharp and may be purchased from Trilogy Marketing, Inc. in the United States. Distributed feedback lasers at 809 nm may be purchased from David Sarnoff Laboratories in Philadelphia, Pa.

The 30 ps, 3 pJ light pulse originating in the source laser is then amplified to the nJ level using a preferred Tm:ZBLAN fiber pre-amplifier. The amplifier is pumped by a diode pumped YLF laser, providing 200 mW of power at 1.053 nm. At this level, the pulse is directed into a low single mode fiber. In this fiber, self-phase modulation will generate the new bandwidth necessary for the formation of subpicosecond pulses, and group velocity dispersion will aid in the generation of a linear chirp suitable for pulse compression. Upon compression, by means of a chirped fiber grating or bulk gratings, the pulse may be passed through a pulse cleaning section comprised of a pair of polarizers and a length of single mode fiber. In this device, polarization of the high intensity peak of the pulse will be modified by nonlinear birefringence to pass through the second polarizer, whereas the lower intensity wings will not pass. This stage eliminates unwanted energy (wings) outside the main pulse before the final amplification stages. An alternative source comprises a tunable DBR laser diode which incorporates a phase adjustment section to prevent mode hopping and enables a smoothly chirped pulse to be generated by a rapidly tuned DBR section. A DBR comprises a distributed BRAGG reflector which is a grating superimposed on a wave guide element. A DBR laser is a laser which uses a DBR (distributed Bragg reflector) as a mirror. By way of example, this source provides 1 ns pulses with up to 100 pJ energies when driven by an electrical pulse at about 1 nanosecond and of a few volts into 50 $\Omega$. In the case where a chirped pulse DFB laser is used to generate the seed signal, compression and pulse cleaning is used to obtain high contrast between the main pulse energy and the pulse wings.

The optical power emanating from the pulse cleaner and stretcher is amplified in an amplifier with one stage or with more than one stage arranged in series. It is preferably split by means of fiber couplers to provide seed pulses for as many as 300 channels of parallel amplifiers. Subsequent compression of the multiple pulses from these amplifiers is accomplished by a single dispersive delay line operating in parallel on all channels simultaneously. Individual phase control placed on each channel further maintains sufficient phase coherence between multiple pulses to allow coherent focusing to within two times diffraction limit. The diffraction limit spot size ($d^o$) is about equal to lambda ($\lambda$, wavelength) divided by the numerical aperture of the focusing optics. The spot size ($d^o$) is also expressed as $d^o = 2 \times f^\# \times \lambda$, where the $f^\#$ designates the aperture of a lens.

Figure 2A:
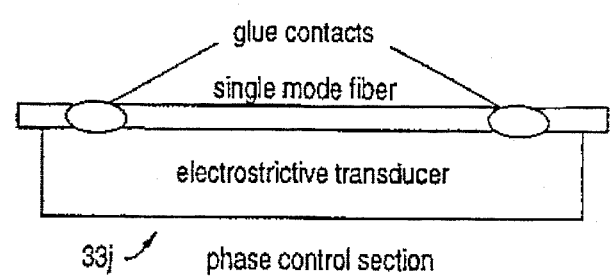
FIGS. 2A and 3A are substantially identical and show detail of a portion of the phase control section for respective FIGS. 2 and 3.
Figure 2B:
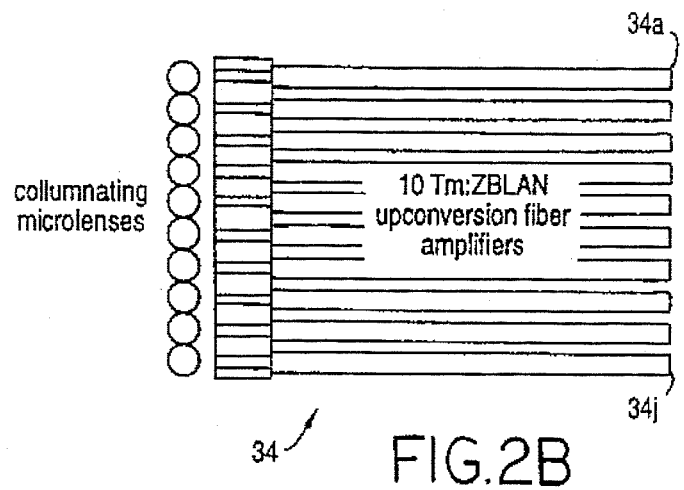
FIGS. 2B and 3B are substantially identical and show detail of the amplifiers for respective FIGS. 2 and 3.
Figure 2:
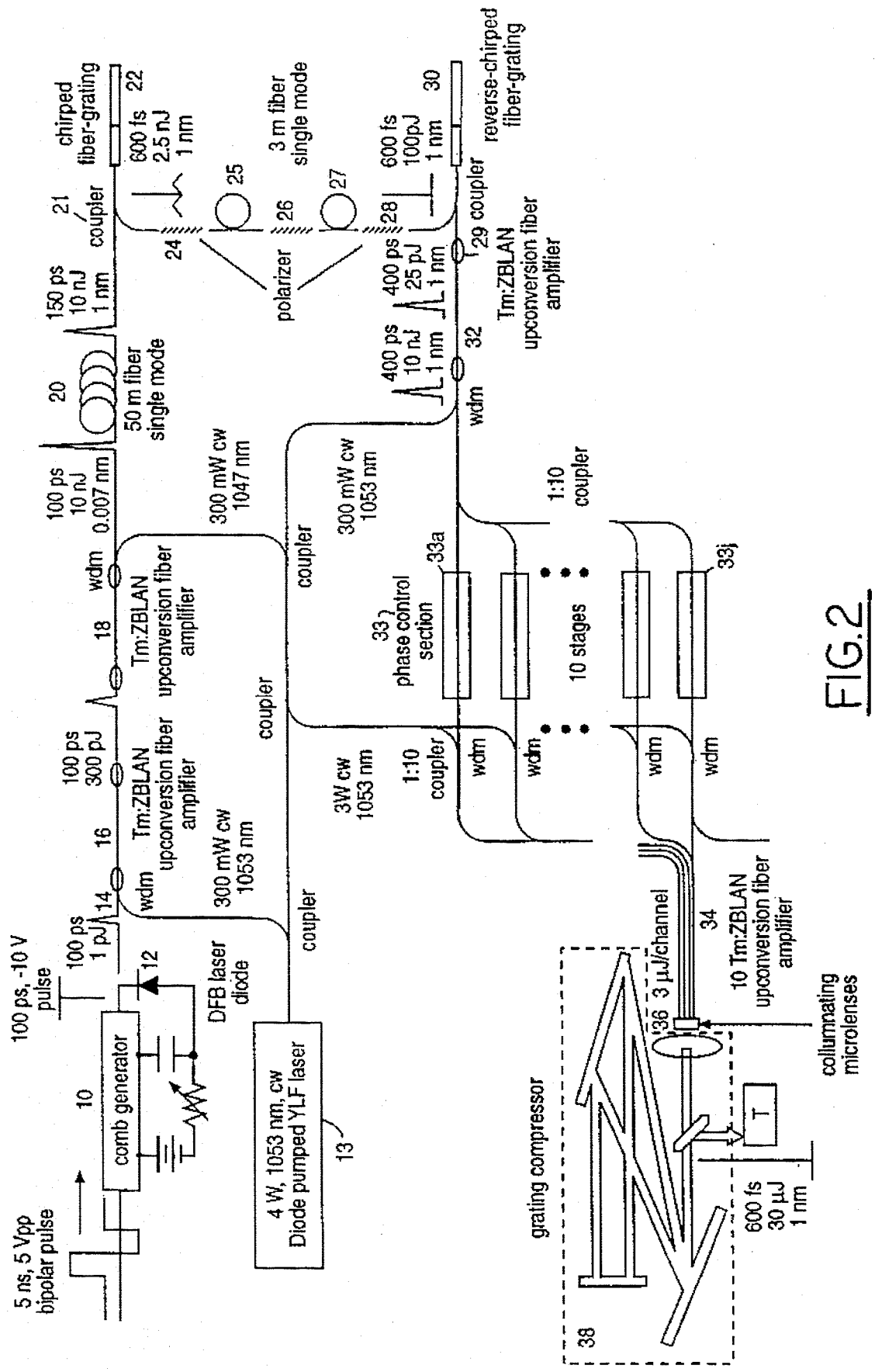
FIG. 2 is a schematic diagram showing one embodiment of a system for producing pulses according to the general process of FIG. 1.

In one embodiment, the generation of the bandwidth necessary to form short pulses takes place in the seed laser. In another embodiment, the generation of bandwidth takes place in the subsequent pulse shaping subsystem of the laser system and preferably in fibers. The latter embodiment allows the process of forming short high contrast pulses to be independent of complex drive electronics. Due to the precise timing of pulse propagation in the optical amplification process of the invention, it is possible to deliver optical pulses through a large number of channels with subpicosecond timing accuracy. Both of these embodiments are encompassed by the general schematic of FIG. 1 described earlier. The generalized system as shown in FIG. 2 comprises generator 10, 12; pre-amplifier 16, 18; optional bandwidth generator 20; compressor 22; cleaner, comprising polarizers 24, 26, 28; and the CPA system comprising: stretcher 30; amplifier 32, 34; and compressor 38. In the case where the generation of bandwidth takes place in the seed laser 12, the optical bandwidth generator 20 is not used. (See FIG. 3.) The optional component 20 is used only when generation of bandwidth takes place in the subsystem, as described earlier.

It is preferred that the amplification means of the CPA means comprise an amplifier with at least two stages arranged in series. In one embodiment, the CPA means further includes means to split each of the pulses into a plurality of separate pulses and the amplification means comprise a plurality of amplifiers with one or more channels arranged in parallel to amplify the respective separate pulses. In one desirable configuration, there is further provided means to adjust the phase of each of the amplifier channels. In one preferred embodiment, the means to adjust the phase of each amplifier channel provides phase coherence between the separate pulses sufficient to cause coherent focusing to a spot size which is less than 10 times a diffraction limit. In another preferred embodiment, the means to adjust the phase of each amplifier channel provides variable time delay for the pulse energy in each of the channels before the energy is directed to individual elements of a target.

The invention will now be described with reference to a preferred system configuration as shown in FIG. 2. Referring to FIG. 2, a +/−5 V, 5 volts peak to peak, 5 ns bipolar electrical pulse is fed to a comb generator 10. This generates a 100 ps electrical pulse which will cause gain switching of fiber coupled DFB laser diode 12. The resulting optical pulse wave length 810 nm, duration 100 ps, and energy of 10 pJ is propagated into the wave length division multiplexer (WDM) 14 where it joins the cw (continuouswave) 1.053 mn pump light of 30 mW pump intensity generated by diode pumped laser 13. The pumped light produced by 12 and 13 is coupled into a 20 cm length of Tm:ZBLAN fiber 15 having 1 percent by weight Tm concentration. In this fiber, the pulse obtains a gain of 300 mW. It should be noted that gain refers to a ratio, that is power ratio of signal out over signal in. The units may be in linear terms as a gain of 300 times or in logarithmic terms as a gain of 30 dB. The dB is defined as ten times the $\log_{10}$ of a ratio. It then passes through a second WDM to join additional 1.053 nm pump light at a second Tm:ZBLAN amplifier 18 where it is amplified to a level of 10 nJ, while approximately maintaining its 100 ps pulse duration. The term "WDM" refers to wavelength division multiplexer. This allows light of one wavelength to be combined with light of another wavelength with essentially no losses. This is useful because it is desired to bring both pump and signal into the amplifier. Note that another coupler used in this system is called a directional coupler. This device splits the power of the light passing through it into predefined proportions at its output ports. This is used to distribute the correct amount of pump light from the pump laser to the various amplifier stages and to allow bi-directional coupling to the chirped fiber grating sections 22 and 30.

The amplified pulse next passes through a section of 810 nm single mode fiber 50 m in length 20. This may be a single length of fiber or separate lengths of substantially the same fiber, coupled together. In the 50 meter fiber 20, the pulse stretches to 150 ps and develops a spectral width of 1 nm. About 50 percent of the light is coupled through the directional coupler 21 to a chirped grating fiber 22 where the chirp induced by self phase modulation and group velocity dispersion is removed, thereby collapsing the pulse duration to less than 1 ps. Here 2.5 nJ of light emerges from the directional coupler 21 to pass into polarizer 24. The rotation of the fiber 25 after polarizer 24 is optimized to enhance peak power transmitted through the second polarizer 26. A clean pulse with contrast of $10^3$ passes from a second length of fiber 22 and third polarizer 28 where contrast is further enhanced to a level of $10^6$. From this point, the pulse passes through a second 50 percent coupler 29 to a reverse chirped fiber grating 30 where it is stretched to prevent damage in the amplifier chain 32. The pulse is amplified to 10 nJ level in amplifier 32. It next passes to a parallel set of ten phase controllers 33 (33a–33j) and ten amplifiers 34 (34a–34j) where a total pulse energy of 30 µJ accumulates. The output of each fiber amplifier (34a–34j) is collimated by lenses at 36 (36a–36j) and the combined pulses are compressed to a high contrast picosecond pulse by grating compressor 38.

The comb generator 10 is preferably a step recovery diode co-axial comb generator which produces a −10 volt electrical pulse of 30–100 picoseconds (ps) duration which drives the laser diode to produce a 100 ps optical pulse. Step recovery diode co-axial comb generators having various drive frequencies from 100 to 1,000 megahertz and narrow output pulse, with typically 120 picoseconds, in a range of 0.1 to 18 gigahertz are available from ST Microwave Corporation of Sunnyvale, Calif. and from FEI Microwave, Inc., of Sunnyvale, Calif. The distributed feedback laser diode (DFB) 12 produces narrow band optical pulses when driven by short electrical pulses. Such DFB laser diodes are available from the David Sarnoff Research Laboratories of Princeton, N.J. The specifications include cw duty cycle, maximum power of 5.0 milliwatts at 58.7 milliamps, and 2.4 volts. The peak wave length is centered at approximately 8101 angstroms wave length with a variability of 0.606 angstroms per degree centigrade. The wave length division multiplexers (WDM) 14 are passive single mode fiber couplers which evanescently couple light of different wave lengths to different ports. Such multiplexers (WDM) are sold by Gould Fiber Optics of Millersville, Md. The Tm:ZBLAN single mode up conversion fiber amplifier 16 operating at 808 nanometers was demonstrated experimentally to have significant gain at 808 nanometers. The ZBLAN fiber 18 is coupled to silica single mode fiber 20 by optical epoxy. A doping level of 1 percent Tm by weight was found to be satisfactory for the ZBLAN fiber. Such thulium (Tm) doped fibers are available from Galileo Electro-optics Corporation of Sturbridge, Mass. Such fibers are sold under the trade name Fluorolase™. They are rare earth doped fluoro-zirconate (ZBLAN) fibers for use in solid state lasers and amplifiers. The propagation of waves in these optical fibers, as in conventional optical fibers, is described in terms of linear polarization modes. The primary factors affecting the propagation of the light in the fiber are the size of the higher index core and the height of this index step over the index of the cladding layer. The first principal of guiding light is that of total reflection, where light travelling in a higher index medium is forbidden from propagating into a lower index medium at certain angles because of the law of reflection (Snell's Law). The second principle governing the propagation of light, in wave guides, is diffraction. Light passing through a small aperture tends to spread into a range of angles. The smaller the aperture, the greater the range of diffraction angles. In a single mode fiber, the effects of total reflection and diffraction are balanced in such a way that light having wavelengths above a cut-off wavelength propagate with low loss, while diffraction spreads the optical energy over the full range of total reflection angles. For wavelengths shorter than the cut-off wavelength, two or more paths (more accurately stated as modes) are allowed to propagate and interfere with each other. These different modes have differing propagation rates just as waves reflecting many times from the fiber walls would have different geometric paths. Nevertheless, the first propagating mode has the highest propagation velocity.

Returning to the primary factors governing the propagation of light in wave guides, and particularly in optical fibers, the core/cladding index step of a fiber determines its numerical aperture in conjunction with the core size, the numerical aperture determine the cut-off wavelength of the fiber. The thulium doped fibers are available with core diameters of 2.3 µm (microns) and numerical aperture of 0.31. The term "NA" represents numerical aperture and is a measure of the spread of angles allowed to propagate in an optical system with a cut-off wave length of 850, up conversion output region of blue and infrared, and with amplification output wave length of 1.4 µm. The single mode silica fiber 18. The splices or connection couplers are designated as oval circles, for example, joining WDM 14 to ZBLAN 16. The length of the ZBLAN fibers 16 and 18 or the level of pumping may be controlled to achieve the desired gain. The generation of spectrum as in the 50 meters of fiber 20 is known. This fiber is a single mode (mono-mode) silica fiber available from Corning Inc., Corning, N.Y.

The process of writing chirped gratings in single mode fibers 22 for the purpose of achieving compression is known. Chirped fiber gratings are fabricated in a holographic arrangement where ultraviolet light is used to write gratings in the fibers after such fibers have been subjected to hydrogen soaking to increase their photosensitivity. The fiber is typically bent during exposure to form chirped period gratings with controllable characteristics to achieve desired reflection bandwidth. This same means of writing gratings of one sign of chirped may be used to write the reverse of that chirped for reverse chirped fiber grating 30. The chirped fiber grating effect depends on the direction the light enters the fiber. Therefore, neglecting the effects of group velocity dispersion, a fiber may be used in a reverse direction to reverse its own chirp as shown in FIG. 2.

An important feature of the invention is the use of polarizers 24, 26, and 28 in combination with rotation of the fibers 25 and 27 between polarizers. Rotation of the fibers 25 and 27 between polarizers 24, 26, and 28 adjusts the static birefringence of the fiber and its orientation to the respective polarizer. The second polarizer 26 absorbs the low intensities. The second stage of pulse cleaning utilizes the output polarizer of the first stage. It is preferred that the polarizers 24, 26, and 28 be in-fiber polarizers. Such fiber polarizers are known and have been prepared by a variety of techniques including polishing the fiber to expose the optical field. For these, high extinction is achieved using an overlay of a birefringent crystal or a metal film. One fabrication technique yields continuous lengths of polarizer fiber economically. This technique is based on a process which allows continuous access to the core optical field, as well as providing a very smooth surface, low scatter surface at which interactions can be obtained. The fiber design permits the integral corporation of a metal to yield a continuous polarizer whose extinction ratio can be selected by cutting to length. This fiber is obtained by using a preform which is then sleeved with the silica tube and drawn into a fiber. A low melting point metal is melted and pumped into the hole in the fiber, followed by drawing metal/glass fibers as a unit. This provides an all solid polarizer structure with high temperature performance. An advantage of the aforementioned fabrication technique is that the fibers are birefringent as a result of asymmetric internal stresses and slight ellipticity of the core. Given that the birefringent axis are automatically aligned to the metal surface, the device both maintains polarization and polarizes. Alternatively, a polarization division multiplexer (PDM) could be used as polarizers in this system. A PDM splits the polarization into two different channels, one of which is coupled to the subsequent system and the alternate one is discarded. PDM's are available from a variety of fiber polarizer vendors, including Oz Optics, Corporation, Ontario, Canada and E-Tech of San Jose, Calif. The specific function of the fiber polarizers 24, 26, and 28 in combination with the single mode fiber 25 disposed between 24 and 26 and the single mode fiber 27 disposed between 26 and 28 will now be more particularly described. The optical pulse cleaner utilizes the technique of intensity discrimination of optical pulses in birefringent fibers. The pulse cleaner is a piece of birefringent fiber 25 between two polarizers 24 and 26; and similarly, fiber 27 between polarizers 26 and 28. Because of the nonlinear index of refraction of the fiber the polarization of the light is intensity dependent. For example, for low intensities linearly polarized light from polarizer 24 is aligned along one of the fiber's 25 birefringent axis and will remain linearly polarized along the same axis. The output polarizer 26 is aligned at 90° to the input polarization at the exit of the fiber to provide complete extinction of the beam. As the intensity is increased, the polarization state changes, and light is transmitted through the output polarizer. This effect is instantaneous and can discriminate against the low intensity wings of a pulse allowing the high intensity peak of the pulse to pass essentially unattenuated. The effects described with aspect to fiber 25 and polarizers 24 and 26 is also obtained in fiber 27 and polarizers 26 and 28. Thus, the pulse cleaner of the invention comprises fiber 25 between polarizers 24 and 26 and fiber 27 between polarizers 26 and 28. The optical pulse cleaner utilizes the technique of intensity discrimination of optical pulses in birefringent fibers. Most fibers display a small degree of natural birefringence due to asymmetry in the production of the fiber. Typical single mode fibers made for telecommunications applications may be used in this apparatus. The pulse cleaner is a piece of birefringent fiber, which may be approximately 3 m in length, spliced between two fiber polarizers and its fast axis aligned to the output polarizer. Alternately, the input may be coupled to the fast axis of the fiber and the output to the slow axis. Because of the nonlinear birefringence of these fibers, the polarization state of the light is intensity dependent. For low intensities, linearly polarized light aligned near to one of the fiber's birefringent axis will remain linearly polarized along the same axis. The output polarizer is aligned at 90° to the input polarization to provide complete extinction of low intensity light. As the intensity is increased, nonlinear coupling between the polarization states takes place, and high intensity light is transmitted through the output polarizer. The use of such a pulse cleaner allows great ease of design in the front end of the laser/amplifier system as the need to maintain absolute control over timing and dispersion is significantly reduced. It should be noted that good pulse cleaning (high contrast) is obtained with a single stage comprised of fiber 25 and polarizers 24 and 26. Better pulse cleaning (very high contrast) is obtained by a second stage where fiber 27 is used between polarizers 26 and 28. A third stage is also possible. Three or more stages would be expected to yield diminishing incremental advantages, and may require additional gain to overcome losses in nonlinear effects.

The light exiting cleaner section after polarizer 28 enters reverse chirped fiber grating 30 which has been heretofore described. The light then enters amplifier 32 which is a Tm:ZBLAN up conversion fiber amplifier as described hereinabove. This amplifier has a gain of 400 times (a factor of about 400) or about 26 dB (decibels).

The phase control section 33 is comprised of a static delay adjusted by cutting the fiber to a precise length, and a dynamic delay varied by stretching the fiber around a piezoelectric transducer, or by inserting an electro-optic phase modulator. The amplifiers 34 (34a–34j) each provide a gain of about 300 or about 25 db (decibels). In this section, the phase control means split each of the pulses into a series of separate pulses. This then permits the use of ten amplifiers to get ten times the energy or power compared to what would have been obtained from only one amplifier. To accomplish this, the ten amplifiers are required to be coherent. To achieve this, a fiber coupler is used which divides the incoming power between ten ports and then amplifies each of the ten ports in ten amplifier stages. Then all of the beams (ten separate pulses) are focused together by collimating lenses 36 for subsequent compression down to a spot in bulk compressor 38. Each of the ten amplifiers 34 (34a–34j) are Tm:ZBLAN up conversion fiber amplifiers.

The collimating microlenses 36 are made from grated index multi-mode fiber, and are bonded to the amplifiers to collimate each of the ten pulses for entry into the final compressor 38.

It should be noted that the ten Tm:ZBLAN up conversion fiber amplifiers 34 (34a–34j) may be either single mode or multi-mode. It is preferred that all of the other Tm:ZBLAN up conversion amplifiers, namely, 16, 18, and 32 be single mode. However, either the single mode or multi-mode version may be selected for the ten amplifiers 34 (34a–34j). As used herein, the term single mode means that the dimension and composition of the fiber are such that only a single polarization mode is allowed to propagate in the core of the fiber essentially unattenuated and the word multi-mode means that more than a single linear polarization mode may propagate in the core of the fiber essentially unattenuated. It is preferred that multi-mode fiber be used to achieve higher output power from the final stage or stages of amplification. The use of multi-mode amplifiers, though it reduces the contrast of the trailing edge of the pulse, preserves the contrast of its rising edge and provides for higher pulse energy than the use of single mode fiber amplifiers.

Bulk gratings 38 are desirable and preferred to prevent damage in this final compression stage. The output from bulk grating 38 is a 30 microjoule ($\mu J$), subpicosecond pulse at about 810 nm (nanometers), more accurately 808 nm.

In the method and apparatus described immediately hereinabove, the first component of the system is the DFB laser diode followed by amplification in fiber amplifier and then followed by, for example, 50 meters of fiber and then followed by a chirped fiber grating. In this configuration, a pulse is generated, then is amplified. In the 50 meters of fiber after amplification, the light beam undergoes self phase modulation which generates new bandwidth. This is followed by compression in the chirped fiber grating.

Figure 3:
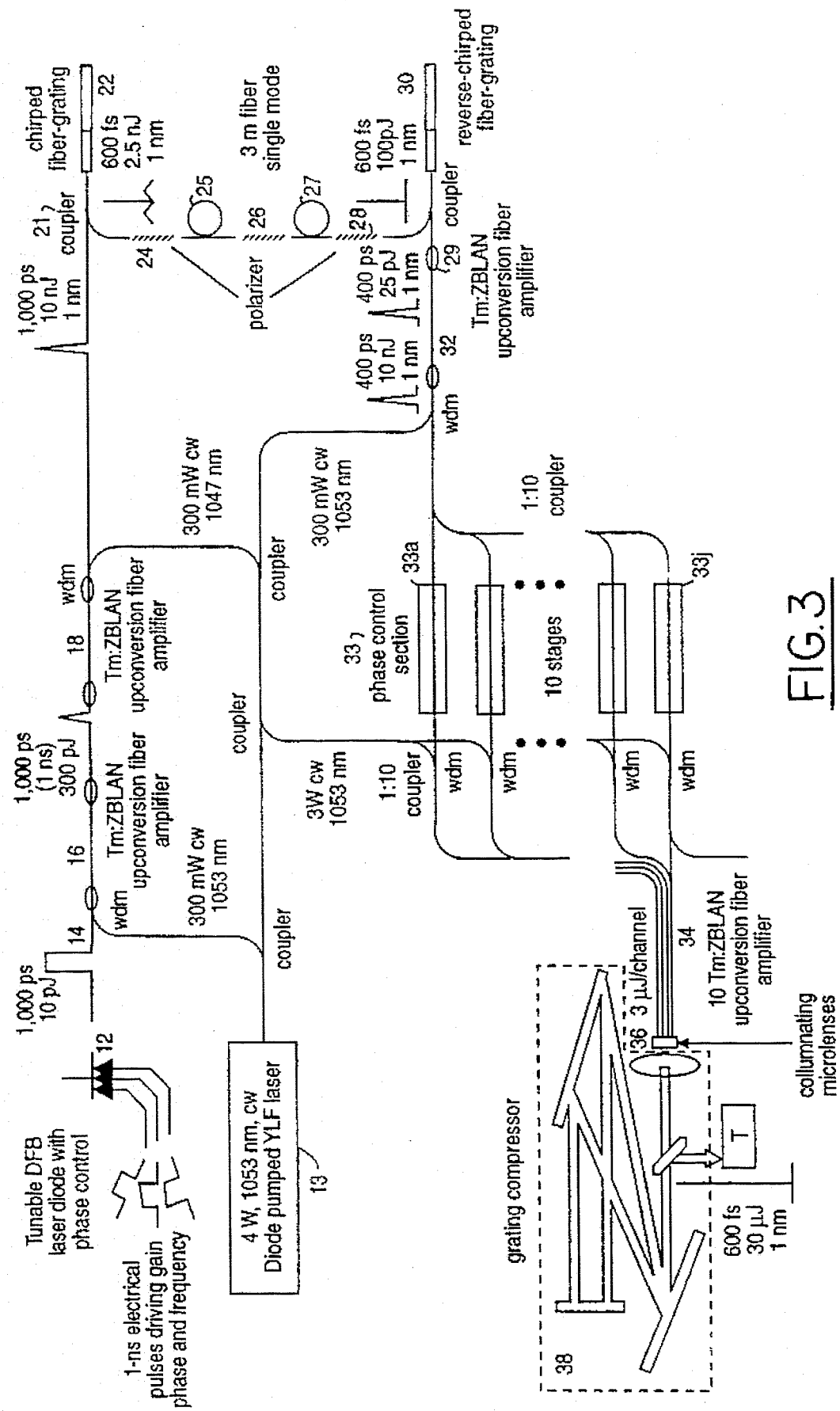
FIG. 3 is a schematic diagram showing another embodiment of a system for producing pulses according to the general process of FIG. 1.

In another embodiment, as shown in FIG. 3, the means of generating bandwidth and the chirp is induced in laser diode 12. In this alternative embodiment, the laser diode 12 itself is a chirped DBR laser which is the selectively triggered pulse source. The chirped DBR laser diode 12 itself generates the chirp and the output beam is then coupled to an amplifier 16 where that chirped signal is amplified, then the amplified chirped signal is compressed in the chirped fiber grating 22. In this alternative embodiment, the 50 meters of single mode fiber is not required because the means of generating bandwidth is in the laser diode itself, and the means of chirping is in the laser diode itself, and all of this occurs before the amplifiers 16 and 18. The treatment of the pulse following compression in the first chirped fiber grating is essentially identical to that of the pulse produced in the first embodiment and is according to the description of FIG. 2.

Consistent with the block diagram of FIG. 1, the method of operation and apparatus of both alternative embodiments, namely, where the selectively triggered pulse source is a DFB laser or a chirped DBR laser, are encompassed. In the case where the source is a DFB laser, the pulse amplifying and shaping chain comprises amplifier, followed by a fiber, followed by compressor, where the compressor is the chirped fiber grating. In the alternative embodiment, where the selectively triggered pulse source is a three section DBR chirped laser, then the pulse amplifying and shaping chain comprises an amplifier, followed by a compressor which is the same chirped fiber grating. Therefore, FIG. 1 shows the generic process used to achieve pulses having any of the desired features from among pulse width, pulse peak intensity, and pulse contrast. Using this general scheme, a number of options are possible. One option is detailed in FIG. 2. Another option is given in FIG. 3. Each of FIGS. 2 and 3 falls within the generic scheme of FIG. 1. As per FIG. 3, a chirped pulse laser is used to directly generate a pulse having a bandwidth sufficient for picosecond pulse formation and having the necessary quadratic phase evolution (i.e., linear chirp). This pulse is then amplified and passed directly to the pulse compressor for cleaning. The distinctions between FIGS. 2 and 3 are mainly these: the location of bandwidth generation; the source of linear frequency sweep; the bandwidth of the amplified pulse; and the use of active versus passive elements for bandwidth and chirp generation. Those skilled in the art will appreciate that the generic scheme of FIG. 1 encompasses a number of system configurations and components besides those illustrated by FIGS. 2 and 3. Other examples, include, but are not limited to, selectively triggered pulse source which is a Q-switched laser producing pulses of sub-nanosecond pulse duration and having sufficient pulse energy to produce self phase modulation in a single mode optical fiber of less than one kilometer length. Such a laser is produced by Microcore of Acton, Mass., and is compatible with Nd-doped amplifier media. As shown in FIGS. 2 and 3, the series of pulses is typically directed onto a target (designated as T). Since laser energy is used for a variety of applications, the character of the target (T) is virtually unlimited. Examples of targets (T) include, but are not limited to, a phased array radio antenna with photoconductive receivers as elements; biological tissue; materials such as metals and dielectrics; and target elements and sub-elements such as in electronic circuits, for diagnosis; and other targets (T) such as optically triggered devices, materials and systems, including those requiring clock (time) distribution, and with photoconductive receivers, switches, and triggers.

As used herein, the terms "guided wave optical device" and "guided wave elements" are used generically to indicate wave guides such as exemplified by optical fibers where the light is continually guided by diffraction and total reflection. Such wave guides include, but are not limited to, planar and slab wave guides which also guide light continually. The term "bulk optical elements" is used to indicate devices where light is reflected, refracted, or diffracted discretely at an interface. Such "bulk" optics include, but are not limited to, mirrors, prisms, lenses, and gratings. A bulk compressor refers to a compressor formed from bulk optics such as gratings or prisms, but does not continuously employ diffraction and total reflection to guide light. It is preferred that the last compressor 38 be a bulk compressor, that is, not an optical fiber compressor, but, rather a grating pair type compressor.

It should further be noted that wave guides which are fibers have a substantially cylindrical geometry, a core, and external cladding. The cladding facilitates light retentionally reflected into the core area and is reflected off of the core cladding interface and remains in the core. The index of refraction of the cladding is always lower than that of the core to achieve this result. Wave guide elements which are planar and grating pairs, are also referred to as slab wave guides or wave guide bodies with a different surface etched or having diffused impurities to change the index of such surface. The chirped fiber grating elements 22 and 30 are shown in the preferred embodiment to be chirped fiber gratings and reverse chirped fiber gratings. However, it should be understood that the guided wave optical devices 22 and 30 could also be planar wave guides and so it is to be understood that they are generically optical chirped guided wave reflectors. They are constructed to reflect one wave length at the front and another wave length at the back. This is accomplished by the grating etched and printed or written or otherwise imposed on the wave guide. Accordingly, the periodicity of the disturbances in the core of the fiber, or in the planar grated surface, changes from one point to another so that selected wave length is reflected at selected points along the grating providing a chirped grating. A reversed chirped grating is essentially a grating which has been turned around so that the light beam enters what was previously the back end of the grating and exits what was previously the front end of the grating. Under this situation where the same fiber is used to impose a chirped and a reverse chirp, the compensation would be essentially perfect. As used herein the word chirped refers to quadratic phase evolution or linear frequency sweep. The terms "pulse width" and "pulse duration" are used interchangeably. The terms "pulse intensity" and "pulse amplitude" are closely related and may be used interchangeably, insofar as when amplitude increases, so does intensity; and when amplitude decreases, intensity also decreases.

A further appreciation of the invention is achieved by understanding the advantage of using passive means of pulse cleaning such as those employed in the pulse cleaner. In systems which use chirped pulse amplification, a critical factor determining pulse to background contrast, as well as pulse duration, is the linearity of the chirp placed on the pulse by the source or by processes such as self phase modulation, the nonlinear effect that gives rise to bandwidth generation in the optical fiber 20 of FIG. 2. The result of either active or passive bandwidth generation gives rise to portions of optical energy which do not posses the correct phase relation to aid in the formation of short pulses. In the case of the chirped laser diode 12 of FIG. 3, the refinement of the electrical signal timing and shaping necessary to form a clean picosecond optical pulse is cumbersome and difficult. The use of a passive pulse cleaner following this device provide means for producing clean picosecond optical pulses, significantly reducing the effort involved in driving the chirped laser diode source. In the case where a passive length of fiber generates new bandwidth and chirp as in FIG. 2, the strong nonlinear nature of self phase modulation requires that pulse cleaning measures be taken. The advantage provided by this invention is that the cumbersome and expensive bulk optics, used in fiber grating compression starting with a flashlamp pumped mode locked laser, have been replaced with guided wave optical elements increasing the ruggedness and reliability of the system.

Further appreciation of the invention may also be achieved by understanding the need for lasers based not on mode locked sources, but on externally triggered sources. Mode locked sources are synchronous in the sense that they generate pulses with a fixed recurring period or phase. In contrast, the selectively triggered pulses of the invention are not restricted to synchronous period or phase. Applications in diagnostics for dynamic systems, such as electronic circuits, often have no means of adjusting their repetition rate. In order to sample these phenomena it is necessary to use diagnostics which can respond to an external trigger. This invention provides a means for achieving significant pulse energy throughout the µJ (microjoule) or sub-millijoule regime, in a clean optical pulse of picosecond or shorter duration, in synchronism with an external trigger.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

We claim:

1. An apparatus for producing optical pulses comprising:
   a. optical pulse generating means for producing a series of optical pulses while varying at least one of pulse width, interpulse spacing, and pulse intensity;
   b. means to increase at least one pulse characteristic of the generated pulse, said characteristic selected from among spectral bandwidth, pulse energy, and the pulse width;
   c. first compression means to compress each of the pulses to a reduced pulse width;
   d. intensity discrimination means to transmit a major portion of the peak intensity of each of the pulses and to prevent transmission of a major portion of the lower intensities of each of the pulses, to increase pulse contrast; and
   e. chirped pulse amplification (CPA) means to increase the energy and decrease the width of the high contrast pulse, said CPA means comprising:
      i. means to chirp the pulse by stretching it temporally and decreasing its peak power;
      ii. amplification means to amplify the chirped pulse; and
      iii. second compression means to compress the chirped and amplified pulse.

2. The apparatus according to claim 1 wherein the means to increase said at least one pulse characteristic comprises second amplification means to obtain the increased pulse energy.

3. The apparatus according to claim 2 wherein the means to increase said at least one pulse characteristic further comprises bandwidth generation means to increase the spectral bandwidth of the pulse.

4. The apparatus according to any of claims 1, 2, or 3 wherein each of the amplification means comprises a guided wave optical element.

5. The apparatus according to any of claims 1, 2, or 3 wherein each of the amplification means is an optical fiber.

6. The apparatus according to any of claims 1, 2, or 3 wherein each of the amplification means comprises Tm-Doped glass fiber.

7. The apparatus according to any of claims 1, 2, or 3 wherein each of the amplification means comprises Tm-Doped fluoro-zirconate glass fiber.

8. The apparatus according to claim 1 wherein the optical pulse generating means comprises a laser diode selectively triggered by an electronic pulse source.

9. The apparatus according to claim 8 wherein the laser diode is a distributed feedback diode laser (DFB) triggered by an electrical pulse generator.

10. The apparatus according to claim 9 wherein the DFB laser is operable in the range of 795 to 815 nanometer wavelength.

11. The apparatus according to claim 8 wherein the laser diode is a three section DBR laser diode which varies pulse energy, pulse width, and spectral bandwidth while impressing a linear chip on the pulse.

12. The apparatus according to claim 11 wherein the three section laser diode is operable in the wavelength range of 795 to 815 nanometers.

13. The apparatus according to claim 1 wherein the optical pulse generating means comprises a comb generator.

14. The apparatus according to claim 1 wherein said amplification means of said CPA means comprises an amplifier with at least two stages arranged in series.

15. The apparatus according to claim 1 wherein said CPA means further includes means to split each of the pulses into a plurality of separate pulses and wherein said amplification means to amplify the chirped pulse comprises a plurality of amplifiers with one or more channels arranged in parallel to amplify the respective separate pulses.

16. The apparatus according to claim 15 wherein said CPA means further comprises means to adjust the phase of each amplifier channel.

17. The apparatus according to claim 16 wherein said means to adjust the phase of each amplifier channel provides phase coherence among the separate pulses sufficient to cause coherent focusing to a spot size which is less than 10 times a diffraction limit.

18. The apparatus according to claim 16 wherein said means to adjust the phase of each amplifier channel provides variable time delay for the pulse energy in each channel before the energy is directed to individual elements of a target.

19. The apparatus according to claim 15 wherein said CPA means further includes means to collimate the plurality of amplified pulses and to direct them into a single bulk compressor constructed and arranged to compress the collimated pulses.

20. The apparatus according to claim 1 wherein said means to increase at least one pulse characteristic comprises at least two optical fibers, at least one of which is a Tm-Doped fluoro-zirconate glass fiber.

21. The apparatus according to claim 20 wherein said means to increase at least one pulse characteristic further includes a chirped fiber grating coupled to at least one of said at least two optical fibers at a first end of said intensity discrimination means.

22. The apparatus according to claim 21 wherein a fiber grating, having a reverse chip relative to the chirped fiber grating, is coupled to a second end of said intensity discrimination means.

23. The apparatus according to claim 1 wherein the intensity discrimination means comprises at least one guided wave optical element.

24. The apparatus according to claim 23 wherein at least one of the guided wave optical elements comprises fiber polarizers.

25. The apparatus according to claim 23 wherein at least one of the guided wave optical elements comprises a polarization division multiplexer (PDM).

26. The apparatus according to claim 23 wherein at least one of the guided wave optical elements comprises an optical fiber with nonlinear refractive index which enables discrimination between high intensity and low intensity.

27. An apparatus for producing optical pulses comprising:
   a. optical pulses generating means for producing a series of optical pulses including means to vary at least one pulse characteristic selected from among pulse width, interpulse spacing, and pulse intensity;

b. first amplification means to increase pulse energy;

c. bandwidth generation means to increase the spectral bandwidth of the pulse;

d. first compression means to compress the stretched pulse;

e. intensity discrimination means to transmit a major portion of the peak intensity of the pulse and to prevent transmission of a major portion of the lower intensities of the pulse, to increase pulse contrast;

f. stretching means to decrease pulse intensity while increasing pulse width of the high contrast pulse;

g. second amplification means to increase pulse energy of the high contrast pulse; and h. second compression means to compress the high contrast, amplified pulse, thereby providing a series of selectively triggered, high contrast pulses.

28. The apparatus according to claim 27 wherein the optical pulse generating means comprises a laser diode selectively triggered by an electronic pulse source.

29. The apparatus according to claim 27 wherein the optical pulse generating means comprises an comb generator.

30. The apparatus according to claim 27 wherein each of the amplification means comprises a guided wave optical element.

31. The apparatus according to claim 27 wherein each of the amplification means is an optical fiber.

32. The apparatus according to claim 27 wherein each of the amplification means comprises Tm-Doped glass fiber.

33. The apparatus according to claim 27 wherein each of the amplification means comprises Tm-Doped fluorozirconate glass fiber.

34. The apparatus according to claim 27 wherein said second amplification means further includes means to split each of the pulses into a plurality of separate pulses and wherein said second amplification means comprises a plurality of amplifiers arranged in parallel to amplify the respective separate pulses.

35. The apparatus according to claim 34 wherein said second compression means further includes means to collimate the plurality of amplified pulses and to direct them into a single bulk compressor constructed and arranged to compress the collimated pulses.

36. The apparatus according to claim 27 wherein the intensity discrimination means comprises at least one guided wave optical element.

37. The apparatus according to claim 27 wherein at least one of the guided wave optical elements comprises fiber polarizers.

38. The apparatus according to claim 37 wherein at least one of the guided wave optical elements comprises a polarization division multiplexer (PDM).

39. The apparatus according to claim 37 wherein at least one of the guided wave optical elements comprises an optical fiber with nonlinear refractive index which enables discrimination between high intensity and low intensity.

40. A method for producing an optical pulse which comprises the steps of:

a. generating a series of optical pulses while varying at least one of pulse width, interpulse spacing, and pulse intensity to produce pulse width of a nanosecond or less;

b. increasing one or more of the following for each of said generated pulses (i) pulse energy, (ii) spectral bandwidth, and (iii) the pulse width, to produce pulses of one nJ (nanojoule) or greater;

c. increasing pulse contrast by transmitting a major portion of the peak intensity of a pulse while preventing transmission of a major portion of the lower intensities of the pulse; and d. increasing pulse energy and decreasing pulse width by chirped pulse amplification of each of the pulses; said chirped pulse amplification comprising the steps of chirping the pulse to stretch it temporally and to decrease its peak power, amplifying the chirped pulse, and then compressing the chirped and amplified pulse.

41. The method according to claim 40 wherein steps (a) and (b) are conducted essentially simultaneously.

42. The method according to claim 40 wherein steps (a) and (b) are conducted to produce pulse width of a nanosecond or less, and pulse energy of at least about 10 nanojoules.

43. The method according to claim 40 wherein step (c) is conducted after steps (a) and (b) to increase pulse contrast by a factor of at least 10.

44. The method according to claim 43 wherein step (c) is repeated before step (d) to increase pulse contrast by a factor of at least 100.

45. The method according to claim 44 wherein step (c) is conducted after steps (a) and (b), and then step (c) is repeated before step (d) to produce a pulse of at least one microjoule (μJ) energy and less than a picosecond pulse width.

* * * * *